United States Patent [19]

Guerin et al.

[11] Patent Number: 4,849,620

[45] Date of Patent: Jul. 18, 1989

[54] OPTRONIC HEADING DEVIATION MEASUREMENT SYSTEM PROVIDING SPATIAL AND SPECTRAL DISCRIMINATION OF INFRARED LIGHT SOURCES

[75] Inventors: Bernard Guerin, Aulnay Sous Bois; Gilbert Coateval, Vitry Sur Seine; Yves Cojan, Paris, all of France

[73] Assignee: Thomson-CSF, Paris, France

[21] Appl. No.: 33,688

[22] Filed: Apr. 3, 1987

[30] Foreign Application Priority Data

Apr. 11, 1986 [FR] France .............................. 86 05243

[51] Int. Cl.⁴ .............................................. G01J 1/20
[52] U.S. Cl. ................................. 250/203 R; 250/339; 356/152
[58] Field of Search ............... 250/203 R, 339, 342, 250/347, 349, 350; 356/141, 152; 244/3.16

[56] References Cited

U.S. PATENT DOCUMENTS 3,174,045  3/1965  Whitney .
3,475,963  11/1969  Astheimer .
4,028,544  6/1977  Jourdan et al. ............... 250/203 R

FOREIGN PATENT DOCUMENTS 2307275  4/1975  France .

OTHER PUBLICATIONS

Revue Technique Thomson-CSF, vol. 2, No. 2, Jun. 1970, pp. 263–282, Paris, FR; G. Couderc: "Ecartometre Infrarouge Semiramis" *FIGS. 3,6; p. 269, ligne 4–p. 271, ligne 10*.

Primary Examiner—Edward P. Westin
Assistant Examiner—Khaled Shami
Attorney, Agent, or Firm—Cushman, Darby & Cushman

[57] ABSTRACT

The system allows homing on a useful target to be obtained in the presence of considerable parasite sources, such as the sun, in the field of observation. It includes elements for the spatial and spectral discrimination of the infrared light sources, formed with a detector strip preceded by a fixed modulation grid, the uniaxial field scanning device, switchable electronic filtering, one band pass and the other low pass, and switching optical filtering, one with very narrow band and the other with wide band. The grid is preferably formed by herringbone patterned tracks. The narrow band filter may be centered towards 4.4 microns and the wide band filter covers 3 to 5 microns for providing homing of a missile by optical deviation heading measurement in a ground-/air or sea/air defense system.

10 Claims, 4 Drawing Sheets

HEADING DEVIATION
MEASUREMENT MANAGEMENT
AND CONTROL

FIG_1
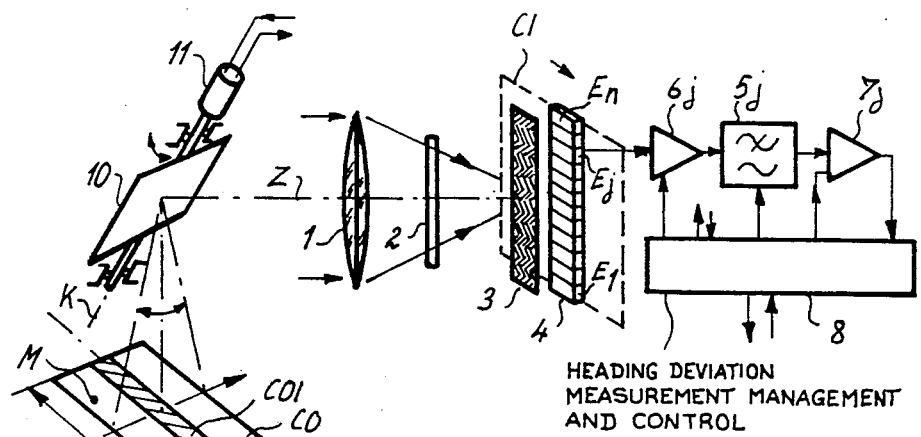
HEADING DEVIATION
MEASUREMENT MANAGEMENT
AND CONTROL
FIG_2
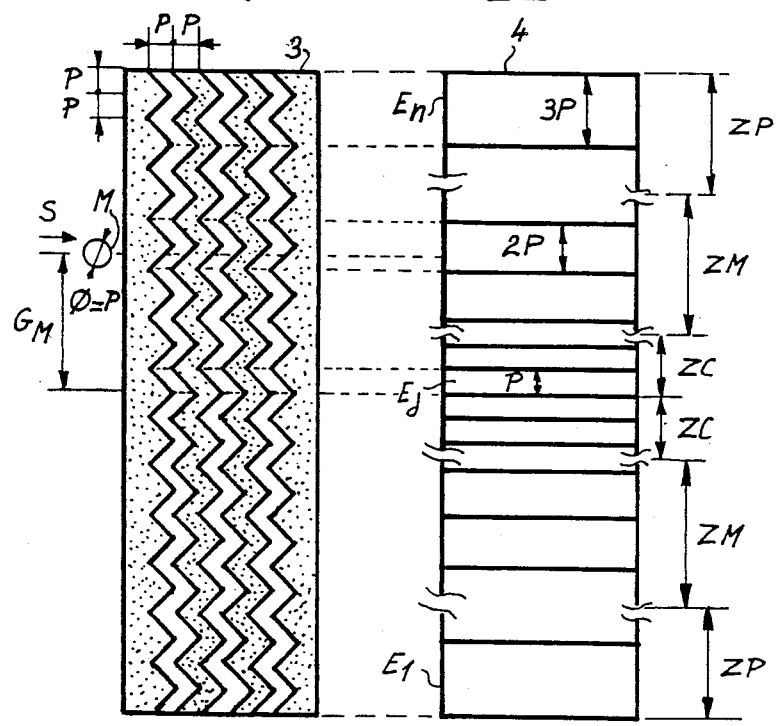

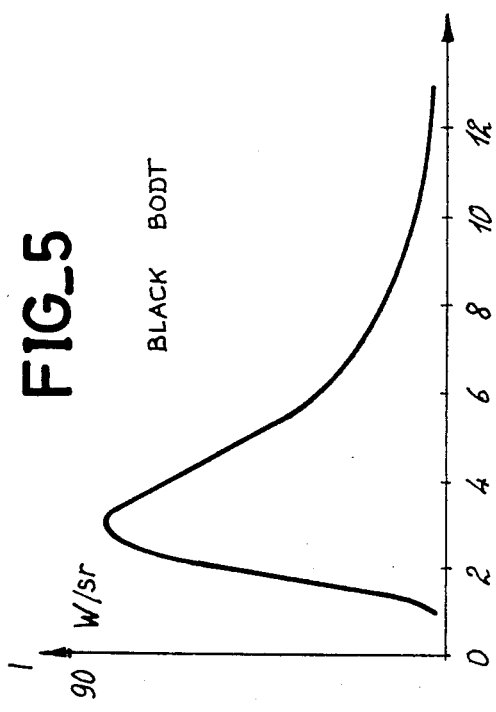
FIG_5
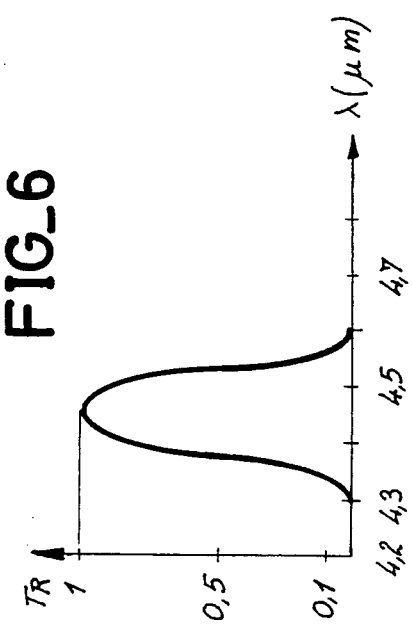
FIG_6
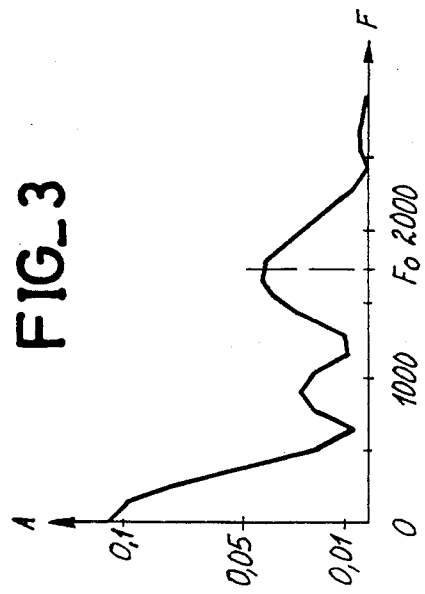
FIG_3
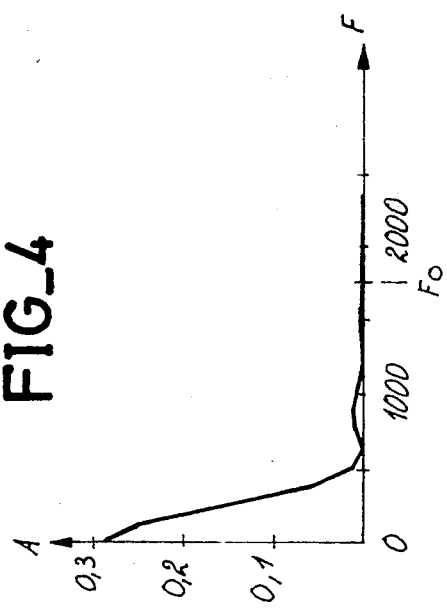
FIG_4

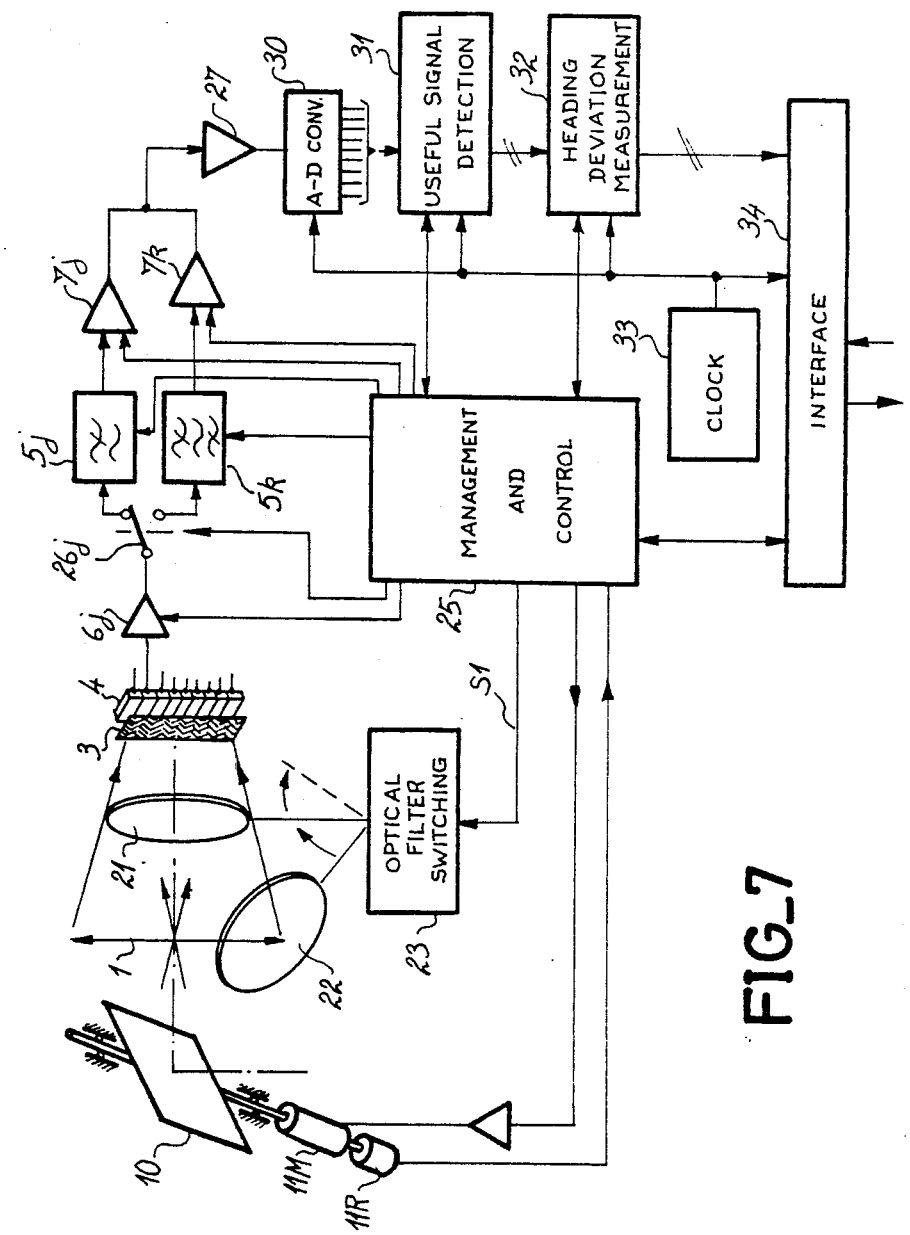
FIG_7

FIG_8
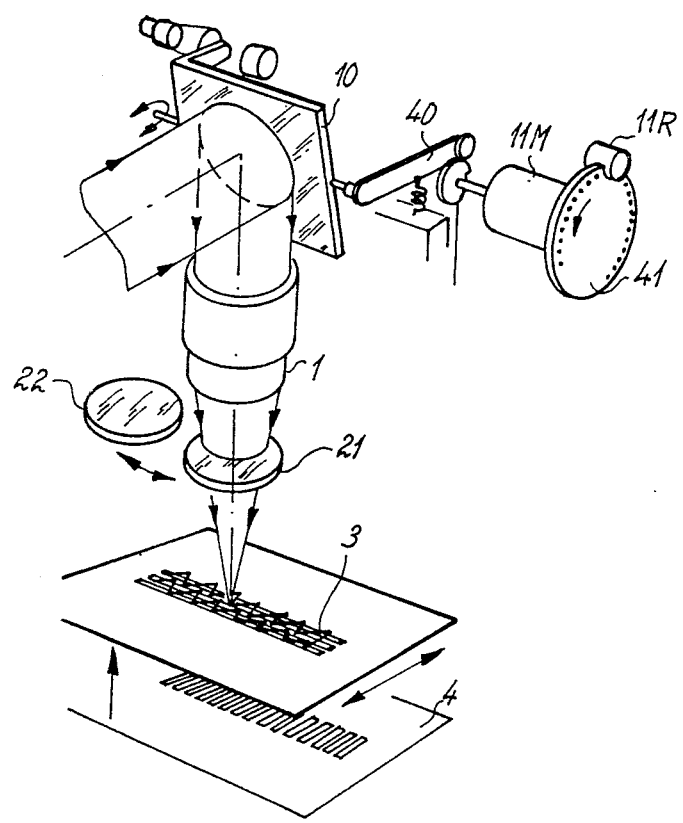

OPTRONIC HEADING DEVIATION MEASUREMENT SYSTEM PROVIDING SPATIAL AND SPECTRAL DISCRIMINATION OF INFRARED LIGHT SOURCES

BACKGROUND OF THE INVENTION

1. Field of the Invention

The present invention relates to an optronic heading deviation measurement system providing high discrimination of infrared light sources not only from the spatial but also the spectral points of view. By light sources is meant the useful source to be detected as well as parasite sources, in particular the sun; these sources differ by their size, their intensity, their spectral energy distribution and this sets difficulties for discrimination and detection.

2. Description of the Prior Art

It is known to obtain spatial selection of sources by inserting in the optical path one or more modulation or reticles grids formed of slits, or by means of transparencies in the case of optical tracks. The modulation is produced by the movement at uniform speed of the grid in a direction orthogonal to the strip for modulating the signal at the frequency of the slits, or according to the corresponding code, the electronic detection being provided by the detector and by matched filtering or downstream correlation circuits. The dimensions of the detector elements and of the transparencies are adapted to the mean dimensions envisaged for the light spot representing the useful target in a predetermined distance range.

To further increase the spatial discrimination it is known to use optical tracks in which the rectilinear profile of the transparencies is modified in accordance with a jagged line forming a herringbone pattern.

To provide spectral discrimination, it is known to use optical filtering with reduced pass band whose central frequency is adapted to that of the radiation of the expected useful target. A solution described in the patent U.S. Pat. No. 4,028,544 uses an assembly of two optical filters, one corresponding to the spectrum of the target to be detected and the other to a spectral band external to this first band; furthermore, the receiving objective is organized for separating the incident radiation into two optical paths and providing focusing at different positions offset by the diameter of the light spot corresponding to the useful target. Each of the optical paths includes one of the filters.

It is also known to provide uniaxial linear scanning of the instantaneous field so as to cover the whole desired extent. The simplest solution consists in using a mirror capable of rotating about an axis; more complex solutions use rings of mirrors or dihedrons.

SUMMARY OF THE INVENTION

The aim of the invention is to use some of these techniques in combination for improving the spatial and spectral discrimination of infrared sources.

Such requirements appear in particular in the firing control of a ground/air or sea/air defense system using a missile against an aerial target which may be an aircraft, a helicopter, or even an attacking missile. After locating the target, these systems generally provide two phases in the guidance of the missile towards the target.

A first phase, called "homing phase" corresponds to the time required for the missile which has just been fired to stabilize itself on the optimum path in the direction of the target. To provide such homing, equipment is required and the size of the field to be covered during this phase, for example 10° by 10°, generally requires an optical heading measuring device capable of working in the spectral band used for working for example in the infrared range. The heading deviation measuring device then allows the components of the angular deviation to be calculated which exists between the missile fired and the target to be reached seen from the firing station.

A second phase, called "guidance phase" then follows after correct homing of the missile, this phase lasts until the missile impacts the target and takes place in a guidance field which, seen from the firing station, is narrow, much more restricted than the homing field, for example 1° by 1°, and within this latter. In general, the guidance takes place by the use of radar means which may be backed up, if required, by optical heading deviation measurement means which are preferably the same as those used for effecting the homing phase. The use of the optical deviation measuring means occurs if the radar breaks down, or else if radar detection is not possible in the case, more especially, of low altitude flight of the missile above the ground or the sea.

Another object of the invention is to improve, in such optronic systems used during the homing phase, the spatial and spectral discrimination of the infrared sources, so as to allow firing even if important parasite sources, such as the sun or reflections thereof on the sea, are situated in the optical field of the heading deviation measurement means required for homing.

The prior spatial filtering techniques mentioned above are suitable when it is a question of discriminating sources of different angular sizes and they provide good rejection of the sources whose size is not matched to the spatial filtering due to the dimensions of the modulation grids and detectors. Such filtering, however, rapidly loses its efficiency if the sizes or if the intensities of the sources are not comparable. Thus, very intense parasite sources produce an effect of saturation of the detection chain despite their generally large size. The infrared heading deviation measurement means must comply with operating requirements which, in a first mode, are to provide homing and then allow guidance of the missile provided with a tracer when the background of the observed field is not disturbed by infrareds. In a second operating mode, the heading deviation measurement means must ensure homing of the missile when this time the background has infrared disturbances, in particular when the sun or parasite reflections are present in the field.

In this case, such a system must not be hindered by the sources of known sizes, situated at different distances from the point of view of the amount of atmosphere passed through so as to be able to follow the useful source.

Thus, with the improvements provided by the invention it is possible to ensure, by infrared heading deviation measurement means homing in the second operating mode, namely in the presence of parasites or of the sun, the guidance phase then being provided by radar in a narrow field.

The requirements of the first operating mode are already satisfied in practice in present day solutions which include a spatial filtering device using a modulation grid, a strip detector, preamplifiers and filtering circuits adapted to modulation of the grid.

According to the invention, in order to comply with the requirements of the second mode, the equipment is adapted so as to produce improved spatial and spectral filtering, with switching of the spectral filtering and switching of the electronic filtering downstream of the detector, the electronic circuits being compatible with both operating modes.

To this end, an optical angular heading deviation measurement system is provided in which the receiving optics focus the light radiation from the observed field on a detector device reduced to a strip of photodetector elements, and which is equipped with means for the spatial and spectral discrimination of the infrared light sources, the spatial discrimination means using a modulation grid having transparent zones separated by opaque zones, the spectral discrimination means using optical filtering, the system further including means for the uniaxial scanning of the field in a direction perpendicular to the strip, and processing circuits downstream of the detector for filtering the modulation frequency of the grids. The spatial discrimination is produced in cooperation by the field scanning means and by the grid which is fixed and which includes transparent zones formed by jagged lines in the form of a herringbone pattern. In a preferred embodiment, in the above mentioned firing control application, the strip has the detector elements distributed according to a variable pitch which is a multiple of an elementary pitch which corresponds to the mean diameter of the useful source expected. Furthermore, the spectral discrimination means is formed by a filtering system having two optical filters which are switchable as a function of the operating conditions present at the time of use, a first pass band filter in a narrow spectral band situated on the edge of an atmospheric absorption band, preferably round about 4.4 micrometers (the abbreviated expression microns will be used in what follows), and a second wide band filter, advantageously in the 3 to 5 micron band. The electronic circuits downstream of these detectors include, for each detector element, electronic filter switching depending on the operation modes to be envisaged with a first filter centered on the modulation frequency due to the grids and due to the field scanning and a second low-pass wide-band filter for the close-up detection of the useful source.

BRIEF DESCRIPTION OF THE DRAWINGS

The features and advantages of the invention will be clear from the following description given by way of example with reference to the accompanying Figures which show:

FIG. 1: a simplified diagram of an optical heading deviation measurement system in accordance with the invention;

FIG. 2: a partial diagram relative to one embodiment of the modulation grid and of the detector illustrating the spatial discrimination operation;

FIG. 3: a curve showing the variation of the frequency spectrum of a small source;

FIG. 4: the curve of variation of the frequency spectrum of an extended source;

FIG. 5: a curve of variation of the spectral intensity radiated by a black body of 1000 K 200 cm$^2$;

FIG. 6: a choice of model for the spectral filtering in the second operating mode;

FIG. 7: a block diagram of an optical heading deviation measurement system in accordance with the invention; and FIG. 8: a diagram of a detail relative to the optomechanical part of the system.

DESCRIPTION OF THE PREFERRED EMBODIMENTS

Referring to the simplified diagram of FIG. 1, the system includes the principal means represented by the reception and focusing objective 1, followed by an optical filter 2 for providing the spectral filtering in the desired working band; then comes the modulating grid 3 preceding a detector device 4 then, downstream of this latter, the electronic circuits for processing the detected signals and for the heading deviation measurement. These circuits include more particularly filtering 5 matched to the frequency (or to the modulation code) delivered by the grids.

In the equipment considered, the photoelectric detector device 4 is formed by a strip of photosensitive elements, each element $E_j$ being followed by a controlled gain preamplification circuit $6_j$, then the corresponding filter $5_j$ and then a comparison circuit $7_j$ with adjustable threshold; the output of the comparator is fed to management and heading deviation measurement circuits represented by a unit 8. Furthermore, a uniaxial field scanning device is included in the system for scanning a total field CO and for producing the modulation, grid 3 being fixed. This device, in its simplest construction, includes a mirror 10 which is pivoted about an axis K sloping with respect to axis Z of the optical system; the part 11 symbolizes an angular transcribing motor and sensor which are connected to unit 8. Considering that the direction of the strip corresponds to a useful azimuth extent AG, the instantaneous objective field COI has as image the contour of the strip in the focal plane of the objective. The angular rotation of the mirror in a given sector will produce the elevational scanning AS and the movement of the image field CI perpendicularly to the strip 4. The mirror is driven with an oscillating movement so as to produce periodically the uniaxial field scan and, jointly with the fixed grid 3, the modulation.

FIG. 2 relates to the grid 3 and strip 4 assembly for illustrating the spatial filtering. In fact, the heading deviation measurement device has to deal with the different sources by their size, their intensity and further by their spectral energy distribution. It is assumed that the useful source has a mean diameter, (presented in a mean distance range, from a minimum separation distance) shown equal to P which defines the constructional pitch of the modulation grid. The parasite sources, generally of large size, may thus be discriminated already at this level, but their high intensity and extensive spectral distribution require complementary means provided at the optical filtering level and at the electronic filtering level as will be seen further on. It should also be considered, in the application envisaged, that the useful source may be very close to the heading deviation measurement device during homing when it has a very large diameter at the outset and progressively decreasing; this involves the need to discriminate the useful source from the parasite sources of similar or comparable size. In the operating mode 1 envisaged, only the missile is present in the field of the apparatus. Since the accuracy required for guidance is high, the spatial filtering elaborated, coming from the grid, selects the small sources of diameter P, P being in general of a diameter less than or equal to 3 milliradians. The spatial filtering is obtained by means of the fixed grid 3 combined with the movement of the field due to the driving of mirror 10. In fact, it will be readily realised that the source M which is situated at the azimuth GM will see its image move in the direction S of the elevations and will pass through the grid and so produce the modulation corresponding to the configuration of the grids.

The grid in the example shown is formed of three transparent tracks which, instead of being rectilinear, are formed of jagged lines in a herringbone pattern.

The strip is formed of n elements $E_1$ to $E_n$ whose longitudinal dimension corresponds to the pitch P or to a multiple value of this pitch. In the example shown adapted for the use envisaged, the strip is provided with several zones, including for each half strip, from the axis of symmetry of the strip, a central zone of extent ZC with elements of a small longitudinal dimension equal to the pitch P so as to have the maximum accuracy in the central zone, then a median zone ZM where the elements have the dimension 2P so as to have average accuracy and finally a peripheral zone ZP in which the longitudinal dimension is equal to 3P. This arrangement with variable pitch is only given by way of non limitative example. By reducing the size of the elements from the periphery towards the center the homing is accelerated and then, during the guidance phase, high accuracy is provided by working in the central region.

As was mentioned above, the downstream electronic circuit includes electric filtering adapted to the modulation of the signal. In fact the frequency spectra of the signals shown in FIGS. 3 and 4 respectively for the useful source and for an extensive parasite source shows that the useful source or an equivalent source of small dimensions has an isolated lobe centered on the modulation frequency $F_o$ which, in the example shown is of the order of 1700 Hz with an appreciable low frequency lobe, whereas the sources of considerable angular extent shown in FIG. 4 have essentially the low frequency spectrum situated between 0 and about 600 Hz. Thus, the discrimination takes place in the filters $5_j$ tuned to the modulation frequency $F_o$. Tuning of the filters may be adjustable electronically by circuit 8. When the missile itself has a considerable angular diameter, FIG. 4 shows that it is necessary to come to terms with the low frequency energy of the signal so as to obtain an electronic signal of sufficient amplitude. It is possible to evaluate and measure the spatial filtering coefficient associated with sources of different sizes for the two operating modes selected. Other discriminating means are brought into play as will be seen hereafter.

FIG. 7 shows in greater detail the block diagram of an optical heading deviation measurement system in accordance with the invention. The elements similar to those in FIG. 1 are shown with the same reference numbers. The system further includes means for the spectral discrimination of the sources formed by an optical filtering device having two filters, a first filter 21 with very narrow pass band centered on a frequency of the radiation spectrum emitted by the missile and a second filter 21 of much wider pass band which extends on each side of the band of filter 21. The high selectivity filter 21 provides several functions. A first function is to protect the detector strip 4 during the periods of non operation. A second function is to allow detection of useful targets during operation in mode 2, i.e. in the presence of parasite disturbances, particularly the sun, in the observed field. Its presence limits the range but avoids saturating the detector. The much wider band filter 22 is intended for homing under normal operating conditions, in mode 1, namely in the absence of disturbances. Circuit 23 symbolizes a device controlling the switching of these filters on reception of a control signal S1 produced by the management and control assembly 25.

As for the electronic circuits, switching of the filtering downstream of detector 4 is also provided. For each detector element there is provided the band pass filter $5_j$ already mentioned and centered on the modulation frequency $F_o$ as well as a second filter $5_k$ of the low pass filter type intended for detecting the low frequency spectrum of the light targets and is therefore used at the beginning of the homing phase when the useful targets have a large size. Switching of the electronic path at the output of the elementary detector is provided through a switching device 26 controlled automatically from the management circuit 25. Downstream of these electric filters we find the threshold comparators $7_j$ and $7_k$ respectively for these two filtering channels. The outputs of these comparators are then applied to the input of a video amplifier 27 which is followed by an A-D conversion circuit 30 for then carrying out the digital processing. Circuit 30 is connected to a useful signal detection circuit 31 followed by a heading deviation measurement circuit 32. A clock circuit 33 delivers the synchronizations to the different circuits and an interface circuit 34 provides the connections with the outside.

The general operation is given hereafter. Before firing, filter F21 is in a position for protecting detector 4. During a preliminary phase controlled automatically by the management of control center 25 on the reception of an external order, filter 21 is replaced by the optical wide band filter 22, each elementary circuit being connected to the electronic band pass filter $5_j$. The detected signals are analysed, if the sun is present in the field these signals will be very high and will exceed a maximum predetermined threshold beyond which the management assembly 25 orders the placing of the narrow band filter 21. If, on the other hand, there are no parasite sources such that the predetermined limit threshold is reached, the wide band filter F22 remains in position. Firing may then take place. In each of these modes, the electric filter $5_k$ or $5_j$ is imposed automatically by the management assembly 25 depending on the optical filter chosen (F21 or F22). The thresholds of comparators $7_j$, $7_k$ as well as the gains of the preamplifier $6_j$ are controlled automatically by the assembly 25.

Determination of the spectral filtering is described with reference to FIGS. 5 and 6. The spectral distribution of the useful sources considered as black bodies having a color temperature of a 1000 K for the missile and 5900 K for the sun, as well as the absolute values of the radiated spectral intensities are such that, whatever the wave length, a considerable disparity of the amplitudes appears. It is then not possible to treat signals coming directly from such dynamics electronically. The values of atmospheric transmissions are also known over ground-ground paths as a function of the distances, and ground-air paths as a function of the elevation of the sighting with respect to the horizon. A feature of the invention is to choose a spectral band situated on the edge of an atmospheric absorption band so as to limit, by taking advantage of the attenuation due to the atmosphere, the dynamics of the signals and make use thereof possible. There exist three main atmospheric absorption bands which would allow working respectively round about 2.8 microns, 4.4 microns or 6.3 microns. For reasons of considerable dependence on meterological conditions, two of these bands are eliminated and the 4.4 micron band is retained, the spectral filters being optimized about this value. The analysis of the spectral distributions of the sun and of the missile as well as the study of the atmospheric spectral transmissions show that the edge of the absorption band of carbonic gas at about 4.4 microns answers the problems of homing in the presence of the sun (operating mode 2) and that the 3 to 5 micron band answers the problems of guidance tracking on an undisturbed background (operating mode 1). FIG. 5 shows the spectral intensity variation of a black body of 1000 K as a function of the wave length and FIG. 6 shows an example of the pattern of the narrow band filter 21 answering the desired selective characteristics. This filter is centered about 4.4 microns and its pass band is of the order of 200 nanometers.

Filter 22 has a pass band which includes this value of 4.4 microns and this band is situated for example between 3 and 5 microns for the contemplated application.

To ensure correct operation, the optics 1 must guarantee good transmission for these wave lengths and its band will be chosen as wide as possible and covering at least the range from 3 to 5 microns of filter 22. Such a choice avoids being penalized by an industrial manufacture of the optical objective which is too delicate.

FIG. 8 shows one embodiment of the opto-mechanical part. In this example the motor 11M drives a cam which, through a cam follower, will cause the lever arm 40 to move so as to rotate the mirror 10. The variation of the movement is a periodic saw tooth. The transcribing sensor 11R is also shown with a clock disk 41. The mechanical device for switching the optical filters 21, 22 is not shown.

In order to provide detection of the signals at these wave lengths, a selenium lead based detector 4 is for example chosen whose cooling is moderate. Other solutions are possible requiring lower cooling temperatures. The detector may be in the form of a small sized strip. With a variable pitch, the strip accelerates homing in the center of the field and the accuracy of the heading deviation measurement depends on the zone of the strip where the optical spot is situated.

The electronic processing is broken down into two functions which are linked together, first of all analog processing between the output of the strip and the conversion circuit 30 with spatial filtering means matched to the modulation frequency, then digital processing which, using known techniques, provides the heading deviation measurements.

The heading deviation measurement means may be in the form of an assembly in a closed box so as to be protected from the environment, with a porthole for penetration of the light flux. The material chosen for the porthole must be suitable for the spectral bands chosen. The optics may be formed from lenses, for example Germanium of Fluorine lenses, ensuring reception of these spectral bands. For protecting the strip 4, the narrow band filter 21 remains placed in position by the control mechanism 23 before firing. Circuit 25 manages the sequences and elaborates the internal control signals, it may advantageously include a microprocessor assembly. This circuit as well as those downstream of amplifier 27 are given by way of example.

What is claimed is:

1. An optical angular heading deviation measurement system including:

optical means for focusing the light radiation coming from an observed field on a detector strip;
  means for spectral discrimination of infrared light sources from said observed field using an optical filtering assembly formed of two optical filters, a first narrow band filter providing high selectivity in the infrared field used, a second wider band filter covering the narrow band of the first filter, and mechanical control means for switching from one filter to the other and vice versa;
  means for spatial discrimination of said infrared light sources, using a fixed modulation grid, formed of transparent zones separated by opaque zones and of a relative displacement means for moving the grid with respect to the field image formed on the strip by said optical means for producing said modulation, said relative displacement means being formed by a device for uniaxial scanning of the field in a direction perpendicular to the strip;
  and means for electronic processing of the detected signals including a first electronic band pass filtering centered on the modulation frequency produced by said fixed grid and said relative displacement means, a second low pass electronic filtering for detecting the low frequency spectrum, and a means for the electronic switching of said filtering.

2. The system as claimed in claim 1, wherein said electronic processing means include downstream of each detector element a first band pass filter and a second low pass filter as well as a switching circuit for connecting said element to the first or to the second of said filters.

3. The system as claimed in claim 1, wherein said first narrow band optical filter ensures protection of the detector strip during the periods of non operation and target detection during the operating periods with the presence of appreciable parasite sources in the field of observation, and said second optical filter being intended for homing under normal operating conditions, namely in the absence of parasite sources.

4. The system as claimed in claim 3, wherein the spectral band of the first optical filter is situated towards one edge of an atmospheric absorption band so as to limit the dynamics of the signals, by taking advantage of the attenuation due to the atmosphere.

5. The system as claimed in claim 4, wherein the first optical filter is centered about 4.4 microns with a pass band of a few tenths of microns.

6. The system as claimed in claim 5, wherein said second optical filter has a pass band situated between 3 and 5 microns.

7. The system as claimed in claim 1, wherein the modulation grid is formed of jagged lines having a herringbone form.

8. The system as claimed in claim 1, wherein the strip is formed of a plurality of detector elements whose dimension along the longitudinal axis of the strip corresponds to a multiple value of the image of the useful target to be detected.

9. The system as claimed in claim 8, wherein the strip is designed with a variable pitch.

10. The system as claimed in claim 9, wherein the variable pitch is distributed over a plurality of zones including, symmetrically from the center of the strip, a first zone with elements of a small longitudinal dimension corresponding to the pitch P so as to have maximum precision in the central detection zone, then a medium zone with elements of dimension 2P so as to have average precision, finally a peripheral zone where the elements have the dimension 3P.

* * * * *